(12) United States Patent
Carlsson

(10) Patent No.: US 11,795,011 B2
(45) Date of Patent: Oct. 24, 2023

(54) VACUUM LIFTING ARRANGEMENT AND METHOD FOR PROVIDING A SUCH

(71) Applicant: TAWI AB, Kungsbacka (SE)

(72) Inventor: John Carlsson, Vessigebro (SE)

(73) Assignee: TAWI AB, Kungsbacka (SE)

( * ) Notice: Subject to any disclaimer, the term of this patent is extended or adjusted under 35 U.S.C. 154(b) by 0 days.

(21) Appl. No.: 17/792,075

(22) PCT Filed: Jan. 13, 2021

(86) PCT No.: PCT/SE2021/050015
§ 371 (c)(1),
(2) Date: Jul. 11, 2022

(87) PCT Pub. No.: WO2021/145815
PCT Pub. Date: Jul. 22, 2021

(65) Prior Publication Data
US 2023/0104207 A1 Apr. 6, 2023

(30) Foreign Application Priority Data

Jan. 14, 2020 (SE) .................................... 2050020-3

(51) Int. Cl.
*B65G 47/91* (2006.01)
*B66C 1/02* (2006.01)

(52) U.S. Cl.
CPC ............ *B65G 47/91* (2013.01); *B66C 1/0293* (2013.01)

(58) Field of Classification Search
CPC .... B65G 47/91; B65G 47/917; B66C 1/0293; B66C 1/0256; B66C 23/022
See application file for complete search history.

(56) References Cited

U.S. PATENT DOCUMENTS

| 3,743,340 | A | 7/1973 | Williamann et al. |
| 8,118,154 | B2* | 2/2012 | Tvetene .................. A01G 20/15 198/689.1 |
| 8,511,196 | B2* | 8/2013 | Ubidia ..................... B25J 9/102 476/36 |
| 9,046,177 | B2* | 6/2015 | Tell ....................... B25J 15/0023 |

(Continued)

FOREIGN PATENT DOCUMENTS

| CN | 205023755 U | 2/2016 |
| DE | 3943285 A1 | 8/1990 |

(Continued)

OTHER PUBLICATIONS

International Search Report and Written Opinion, International Application No. PCT/SE21/050015, dated Feb. 23, 2021, 12 pages.

(Continued)

*Primary Examiner* — Stephen A Vu
(74) *Attorney, Agent, or Firm* — Quarles & Brady LLP

(57) ABSTRACT

The disclosure relates to a vacuum lifting arrangement comprising a vacuum pump, a valve arrangement, a support structure, and a flexible lifting tube comprising a suction foot. The vacuum pump is connected to the valve arrangement and to the flexible lifting tube. The valve arrangement is arranged to extend and retract the flexible lifting tube. The valve arrangement is arranged separate from the suction foot, between the vacuum pump and the suction foot. The disclosure also relates to a method of providing a vacuum lifting arrangement.

8 Claims, 3 Drawing Sheets

(56) References Cited

U.S. PATENT DOCUMENTS

| | | | |
|---|---|---|---|
| 10,493,637 B2* | 12/2019 | Taira | B25J 15/0616 |
| 10,634,243 B2* | 4/2020 | Defranceski | F16H 61/433 |
| 2014/0360961 A1 | 12/2014 | Steffes | |

FOREIGN PATENT DOCUMENTS

| | | |
|---|---|---|
| DE | 10151883 A1 | 5/2003 |
| FR | 2765203 A1 | 6/1997 |
| WO | WO-1995-030615 A1 | 11/1995 |

OTHER PUBLICATIONS

International Preliminary Report on Patentability, International Application No. PCT/SE21/050015, dated Jan. 28, 2022, 13 pages.

\* cited by examiner

VACUUM LIFTING ARRANGEMENT AND METHOD FOR PROVIDING A SUCH

RELATED APPLICATIONS

This application is a 35 U.S.C. § 371 national phase application of PCT/SE2021/050015 (WO 2021/145815 A1), filed on Jan. 13, 2021, entitled "VACUUM LIFTING ARRANGEMENT AND METHOD FOR PROVIDING A SUCH," which application claims the benefit of SE Patent Application No. 2050020-3, filed Jan. 14, 2020, the entire teachings of which are incorporated herein by reference in their entirety for all purposes.

TECHNICAL FIELD

The disclosure relates to a vacuum lifting arrangement comprising a vacuum pump, a valve arrangement, a support structure, and a flexible lifting tube comprising a suction foot. The vacuum pump is connected to the valve arrangement and to the flexible lifting tube. The valve arrangement is arranged to extend and retract the flexible lifting tube. The disclosure also relates to a method of providing a vacuum lifting arrangement.

BACKGROUND ART

Vacuum lifting devices are well known in the art and are used in many types of businesses to assist an operator in lifting heavy, cumbersome and/or ungainly items. A vacuum lifting device may comprise a vacuum source connected to a housing on which a suction foot is attached. The vacuum source creates a vacuum inside the suction foot when the suction foot is attached to an item, thereby allowing the item to be lifted and moved. An operator uses operating means on the housing to raise and lower the suction foot and to release the load from the suction foot. A valve arrangement attached to the suction foot controls the vertical position of the suction foot as well as controls the release of a load when attached to the suction foot. The valve arrangement increases the height of the suction foot that makes it heavy and difficult to handle. Air passing through the suction foot/valve arrangement also creates a lot of noise which leads to that the operator must wear hearing protection to avoid damage to his/her hearing.

There is thus a need for an improved vacuum lifting device.

SUMMARY

One object of the present disclosure is to provide an inventive vacuum lifting arrangement and a method for providing such a vacuum lifting arrangement, where the previously mentioned problems are at least partly addressed. This object is achieved by the features of the characterising portion of claims 1 and 8. Variations of the disclosure are described in the appended dependent claims.

The disclosure relates to a vacuum lifting arrangement comprising a vacuum pump, a valve arrangement, a support structure, and a flexible lifting tube comprising a suction foot. The vacuum pump is connected to the valve arrangement and to the flexible lifting tube. The valve arrangement is arranged to extend and retract the flexible lifting tube. The valve arrangement is arranged separate from the suction foot, between the vacuum pump and the suction foot.

By separating the valve arrangement from the suction foot, both the problem of the added height of the valve arrangement to the suction foot as well as the problem that the valve arrangement causes a lot of noise can be addressed. The valve arrangement can be moved to a location within the same room as the vacuum lifting arrangement or to a separate room. Depending on where the vacuum pump is arranged, it may be advantageous to place the valve arrangement close to the vacuum pump or at a distance from the vacuum pump. Ease of servicing the valve arrangement can also be a factor in the placement of the valve arrangement.

A further advantage with the disclosure is that a vacuum lifting arrangement can be retrofitted with a valve arrangement that is separated from the suction foot.

The valve arrangement may be arranged to be remotely operated by an operator of the suction foot.

The valve arrangement requires to be operated in order to control the suction foot. Today, this is done by direct operation on the valve arrangement by the operator. This is preferably, but not necessarily, solved by arranging the valve arrangement to be remotely operated by the operator. It may also be possible for the valve arrangement to be manually operated; this would require an additional operator.

The suction foot may comprise a remote control and the valve arrangement may comprise a remote controlled actuating means arranged to actuate the valve arrangement, wherein the remote controlled actuating means is arranged to be remotely controlled by one of:
  a hardwired connection between the remote control and the remote controlled actuating means,
  a radio connection between the remote control and the remote controlled actuating means,
  a Bluetooth® connection between the remote control and the remote controlled actuating means,
  a wireless mobile telecommunications connection between the remote control and the remote controlled actuating means,
  a Wi-Fi connection between the remote control and the remote controlled actuating means,
  an infrared connection between the remote control and the remote controlled actuating means.

Depending on the location of the valve arrangement, different types of remote control technologies are conceivable, each with their own advantages and disadvantages. The type of remote control technology chosen for a vacuum lifting arrangement is selected based on the specific application of the vacuum lifting arrangement.

The remote controlled actuating means may be remotely controlled by a hardwired connection between the remote control and the remote controlled actuating means and a wire of the hardwired connection may be arranged inside the flexible lifting tube or on the outside of the flexible tube.

In case the remote controlled actuating means is remotely controlled by a hardwired connection between the remote control and the remote controlled actuating means, at least one wire has to be attached between the remote controlled actuating means and the remote control. Depending on the vacuum lifting arrangement, the wire can be made to run inside the flexible lifting tube or on the outside of the flexible lifting tube.

The remote control may be one of a piezoelectric sensor, a pressure sensor, a potentiometer, push buttons, levers or electromechanical control means.

The remote control on the suction foot can be any one of a suitable remote control, potentially connected to a transmitter if the remote control is wireless. The remote control can also be levers or electromechanical control means.

The suction foot may comprise a movable valve plate arranged to close against a seal during operation of the vacuum pump when no load is attached to the suction foot.

The movable plate is pressed against the seal by the vacuum generated by the vacuum pump during operation when no load is attached to the suction foot. Alternatively, the movable valve plate has a weight that ensures that it closes against a seal during operation when no load is attached to the suction foot. This leads to that no flow passes through the suction foot and thus that no noise arises from air flow through the suction foot. This further adds to the reduction of noise from the entire vacuum lifting arrangement.

The disclosure also relates to a method for providing a vacuum lifting arrangement, wherein the vacuum lifting arrangement comprises a vacuum pump, a valve arrangement, a support structure, and a flexible lifting tube comprising a suction foot. The method comprises:

arranging the valve arrangement to be connected to the vacuum pump and to the flexible lifting tube, wherein the valve arrangement is arranged separate from the suction foot, between the vacuum pump and the suction foot.

The method may also comprise:

arranging a remote control on the suction foot,
arranging a remotely controlled actuating means on the valve arrangement,
wherein the remote controlled actuating means is arranged to be remotely controlled by the remote control on the suction foot.

The remote controlled actuating means may be remotely controlled by a hardwired connection between the remote control and the remote controlled actuating means, wherein the method comprises:

providing the hardwired connection within the flexible tube lift by operating the vacuum pump to suck the hardwired connection into the flexible tube.

The method may also comprise:

providing a movable valve plate within the suction foot arranged to close against a seal during operation of the vacuum pump when no load is attached to the suction foot.

The advantages with the method are the same as for the vacuum lifting arrangement.

DETAILED DESCRIPTION

Within the content of this application, remotely operated or remotely controlled means being able to or be arranged to be operated or controlled at a distance. The remote operation or remote control can be performed by wireless or by wired means.

Figure 1:
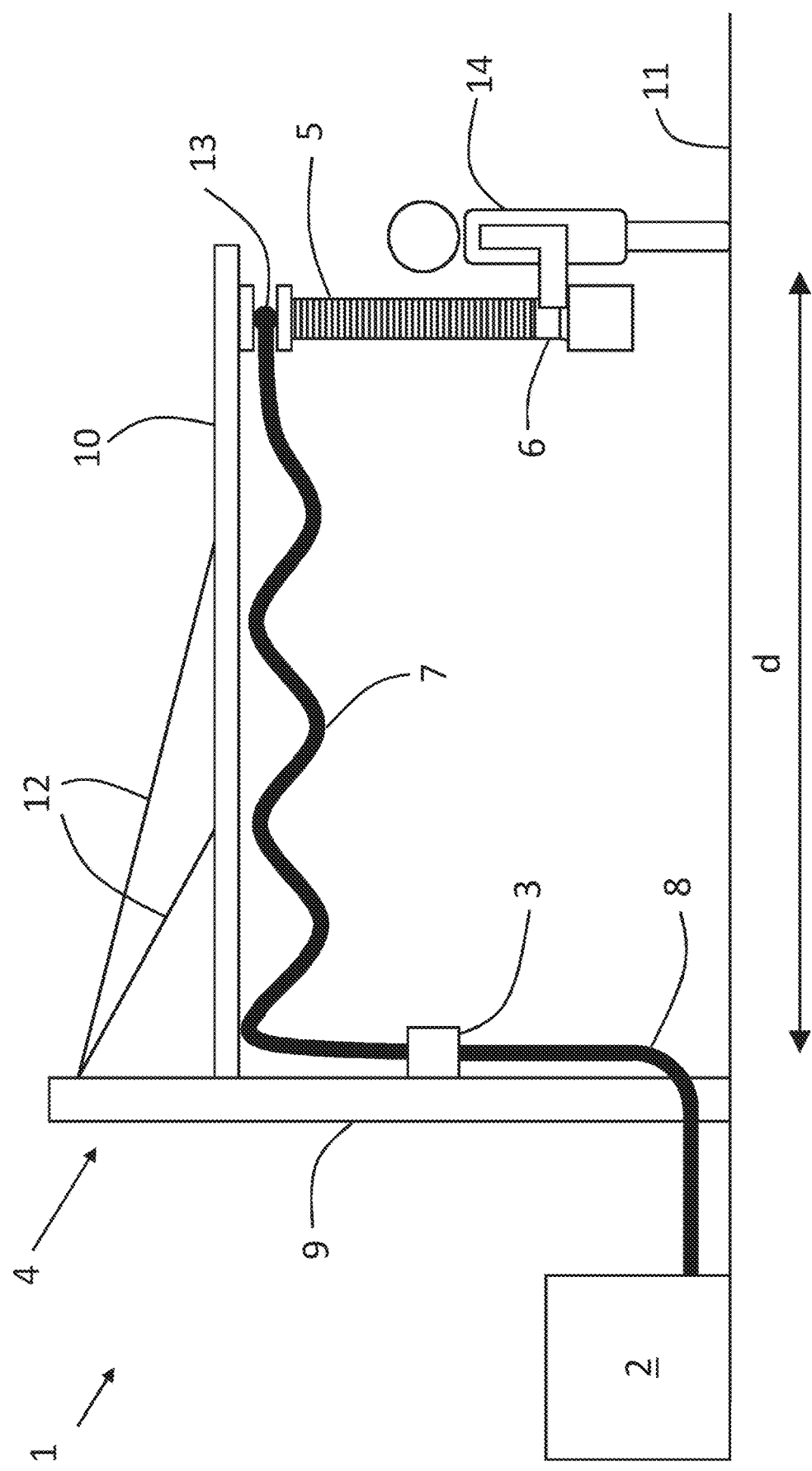
FIG. 1 schematically shows a vacuum lifting arrangement according to a first example embodiment, FIG. 2 schematically shows a vacuum lifting arrangement according to a second example embodiment, FIGS. 3a and 3b schematically show a cross sectional view of a suction foot used with the vacuum lifting arrangement according to the disclosure.

FIG. 1 schematically shows a vacuum lifting arrangement 1 according to a first example embodiment. The vacuum lifting arrangement 1 comprise a vacuum pump 2, a valve arrangement 3, a support structure 4, and a flexible lifting tube 5 comprising a suction foot 6. The vacuum pump 2 is connected to the valve arrangement 3 via a first vacuum connection 7. The valve arrangement 3 and the flexible lifting tube 5, and thereby the suction foot 6, are connected via a second vacuum connection 8. The valve arrangement 3 is arranged to extend and retract the flexible lifting tube 5 upon operation of the valve arrangement 3. The valve arrangement 3 is arranged separate from, or at a distance from the suction foot 6, between the vacuum pump 2 and the suction foot 6. The valve arrangement 3 and the suction foot 6 are thus physically separated from each other, i.e. the valve arrangement 3 is a separate unit and the suction foot 6 is a separate unit. Previous vacuum lifting arrangement 1 comprises suction feet 6 where the valve arrangement 3 is an integral part of the suction feet 6.

The support structure 4 comprises a vertical support part 9 and a horizontal support part 10 attached to the vertical support part 9 at a distance from a floor 11. Stays or struts 12 may connect the vertical support part 9 and the horizontal support part 10 in order to improve the durability and the lifting capacity of the support structure 4. The flexible lifting tube 5 is attached to the support structure 4 via a rotatable connection 13 on the horizontal support part 10 that enables an operator 14 to manoeuvre the suction foot 6 and the flexible lifting tube 5 to a certain degree. The construction of the support structure 4 and the attachment of the flexible lifting tube 5 to the horizontal support part 10 are well known in the art.

In the first example embodiment, the valve arrangement 3 is arranged on the vertical support part of the support structure 4. The valve arrangement 3 may also be arranged on a different surface, such as on a wall, on a beam or on a pillar of the room the vacuum lifting arrangement 1 is installed. The first vacuum connection 7 and the second vacuum connection 8 may be attached to the vertical support part 9 and/or the horizontal support part 10. As the valve arrangement 3 is now located at a distance d from the operator 14, any sound from the valve arrangement 3 including sounds caused by the passing of air through the valve arrangement 3 is attenuated before it reaches the operator 14. Further, the suction foot 6 can be made considerably smaller due to the separate placement of the valve arrangement 3. The vacuum pump 2 is in FIG. 1 shown to be placed in the same space as the operator 14. This is not necessary and the vacuum pump 2 may be placed in a different room to reduce the sound coming from the vacuum pump 2.

The valve arrangement 3 is arranged to be remotely operated by the operator 14 of the suction foot 6. This is achieved by that the suction foot 6 comprises a remote control (not shown) and by that the valve arrangement 3 comprises a valve (not shown) connected to a remote controlled actuating means (not shown) arranged to actuate the valve of the valve arrangement 3. The valve and valve actuating means can be of any type suitable for work with a vacuum lifting arrangement 1.

The remote controlled actuating means is according to one example arranged to be remotely controlled by a hardwired connection between the remote control and the remote controlled actuating means, i.e. a wire connecting the remote control on the suction foot 6 with the remote controlled actuating means.

The remote controlled actuating means is according to a further example arranged to be remotely controlled by a radio connection between the remote control and the remote controlled actuating means. Suitable radio frequencies for remote control are known in the art.

The remote controlled actuating means is according to a further example arranged to be remotely controlled by a Bluetooth® connection between the remote control and the remote controlled actuating means.

The remote controlled actuating means is according to one example arranged to be remotely controlled by a wireless mobile telecommunications connection between the remote control and the remote controlled actuating means. This can for instance be a second generation (2G or 2.5G), third generation (3G), fourth generation (4G) or fifth generation (5G) wireless mobile telecommunications connection. Future wireless mobile telecommunications connections could also be conceivable to work with the vacuum lifting arrangement 1 according to the disclosure.

The remote controlled actuating means is according to one example arranged to be remotely controlled by a Wi-Fi connection between the remote control and the remote controlled actuating means.

The remote controlled actuating means is according to one example arranged to be remotely controlled by an infrared connection between the remote control and the remote controlled actuating means. This can be useful when line of sight between the remote control and the remote controlled actuating means is available.

If the remote controlled actuating means is remotely controlled by a hardwired connection between the remote control and the remote controlled actuating means, the wire of the hardwired connection can be arranged either inside the flexible lifting tube 5 or on the outside of the flexible lifting tube 5.

The remote control arranged on the suction foot 6 can be one of a piezoelectric sensor, a pressure sensor, a potentiometer, push buttons, levers or electromechanical control means. Any type of remote control arranged to work with the different connections mentioned above can be integrated into the suction foot 6.

Figure 2:
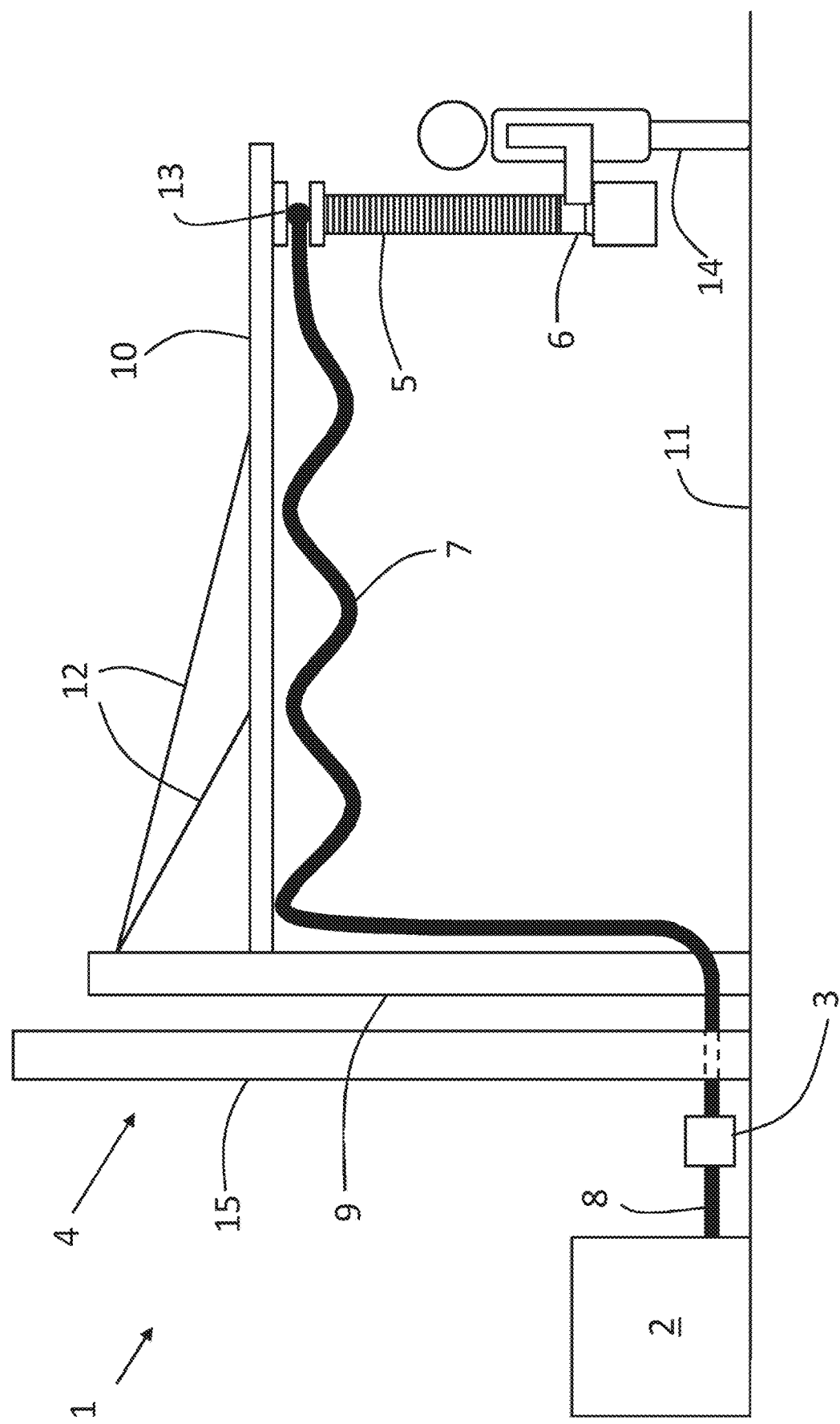

FIG. 2 schematically shows a vacuum lifting arrangement 1 according to a second example embodiment. The difference between the vacuum lifting arrangement 1 of FIG. 2 and the vacuum lifting arrangement 1 of FIG. 1 is that in the second example embodiment, the valve arrangement 3 is placed behind a wall 15 together with the vacuum pump 2. This further increases the attenuation of the sound from the valve arrangement 3 and it may be beneficial for servicing the vacuum lifting arrangement 1 to have both the valve arrangement 3 and the vacuum pump 2 placed together. Further, by having the vacuum pump 2 and the valve arrangement 3 placed behind the wall 15, the sound level at the operator 14 can be reduced to a level where hearing protection is no longer needed.

Figure 3B:
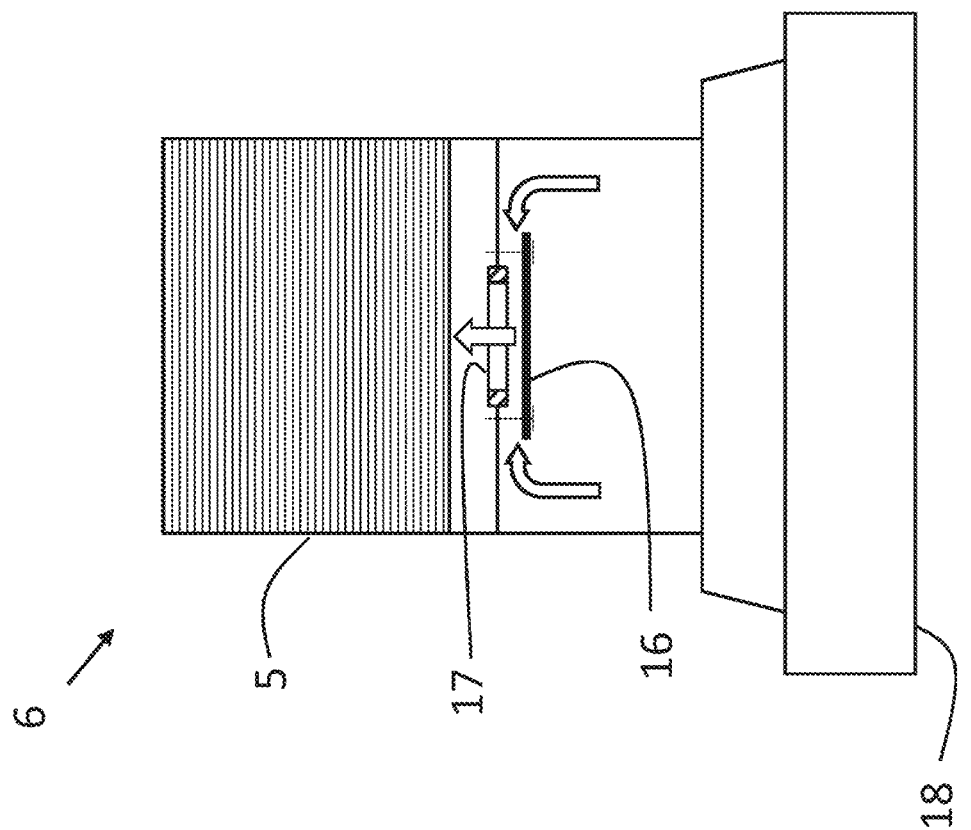
Figure 3A:
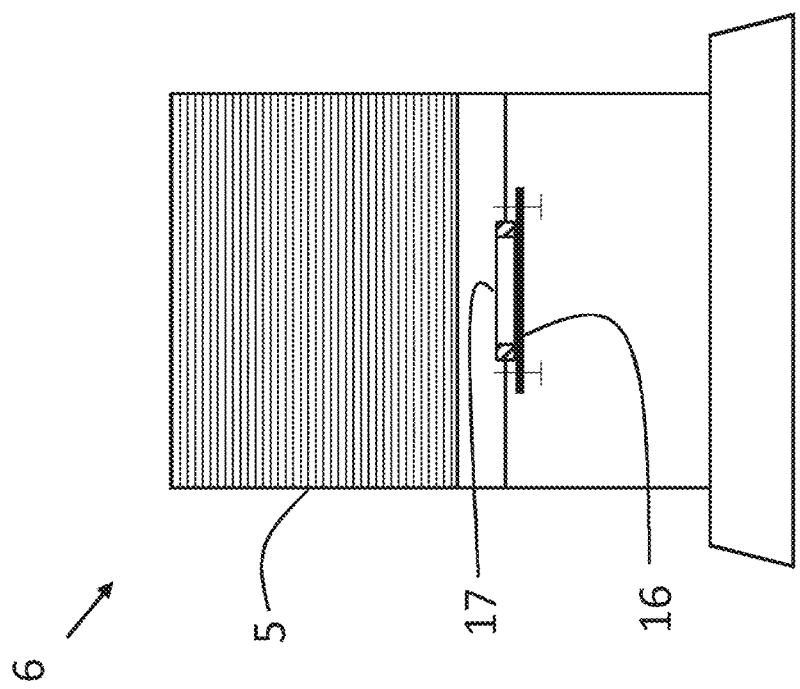

FIGS. 3a and 3b schematically show a cross sectional view of a suction foot 6 used with the vacuum lifting arrangement 1 according to the disclosure.

In FIG. 3a, the suction foot 6 is shown without a load attached to it. The suction foot 6 comprises a movable valve plate 16 arranged to close against a seal 17 during operation of the vacuum pump 2 when no load is attached to the suction foot 6. When no load is attached to the suction foot 6, the vacuum generated by the vacuum pump 2 causes the valve plate 16 to be pressed towards the seal 17 by the ambient pressure. When the valve plate 16 is pressed against the seal 17, no more air can pass through the seal 17 and the suction foot 6 is sealed from the ambient air.

In FIG. 3b, the suction foot 6 is shown with a load 18 attached to it. With a load 18 attached to the suction foot 6, the suction foot 6 is sealed by the load 18 which means that there is no flow from the vacuum pump 2 passing through the suction foot 6. Thus, the valve plate 16 drops down from the seal 17. The valve plate 16 is arranged on fastening means 19 arranged to limit the movement of the valve plate 16 when no flow from the vacuum pump 6 is present.

As an alternative to the movable plate 16 configuration in FIGS. 3a and 3b, the movable plate can be arranged above the seal 17 such that the weight of the movable plate 16 causes the movable plate 16 to seal against the seal 17 when there is no load 18 attached to the suction foot 6. When a load 18 is attached to the suction foot 6, the vacuum created in the suction foot 6 causes the movable plate 16 to release from the seal 17.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Accordingly, the drawings and the description thereto are to be regarded as illustrative in nature, and not restrictive. In FIGS. 1 and 2, the horizontal support part 10 of the support structure 4 is attached to a vertical support part 9. The horizontal support part 10 may alternatively be attached to a wall or a ceiling. The horizontal support part 10 can also be attached to a vertical support part 9 attached to a mobile platform so that the entire vacuum lifting arrangement 1 is movable.

The invention claimed is:

1. A vacuum lifting apparatus comprising:
   a vacuum pump;
   a valve arrangement;
   a support structure; and
   a flexible lifting tube comprising a suction foot, wherein the vacuum pump is connected to the valve arrangement and to the flexible lifting tube, wherein the valve arrangement is configured to extend and retract the flexible lifting tube, the valve arrangement is configured to separate from the suction foot, between the vacuum pump and the suction foot, wherein the suction foot comprises a movable valve plate configured to close against a seal during operation of the vacuum pump when no load is attached to the suction foot.

2. The vacuum lifting apparatus of claim 1, wherein the valve arrangement is configured to be remotely operated by an operator of the suction foot.

3. The vacuum lifting apparatus of claim 2, wherein the suction foot comprises a remote control and the valve arrangement comprises a remote controlled actuator configured to actuate the valve arrangement, wherein the remote controlled actuator is configured to be remotely controlled by one of:
   a hardwired connection between the remote control and the remote controlled actuator,
   a radio connection between the remote control and the remote controlled actuator,
   a Bluetooth® connection between the remote control and the remote controlled actuator,
   a wireless mobile telecommunications connection between the remote control and the remote controlled actuator,
   a Wi-Fi connection between the remote control and the remote controlled actuator,
   an infrared connection between the remote control and the remote controlled actuator.

4. The vacuum lifting apparatus of claim 3, wherein the remote controlled actuator is remotely controlled by the hardwired connection between the remote control and the remote controlled actuator, and wherein a wire of the hardwired connection is arranged inside the flexible lifting tube or on the outside of the flexible lifting tube.

5. The vacuum lifting apparatus of claim 3, wherein the remote control is one of a piezoelectric sensor, a pressure sensor, a potentiometer, push buttons, levers or electromechanical controls.

6. A method for providing a vacuum lifting arrangement, wherein the method comprises:
 arranging a valve arrangement to be connected to a vacuum pump and to a flexible lifting tube comprising a suction foot, wherein the valve arrangement is arranged separate from the suction foot, between the vacuum pump and the suction foot; and
 providing a movable valve plate within the suction foot arranged to close against a seal during operation of the vacuum pump when no load is attached to the suction foot.

7. The method of claim 6, wherein the method comprises:
 arranging a remote control on the suction foot;
 arranging a remote controlled actuator on the valve arrangement,
 wherein the remote controlled actuator is arranged to be remotely controlled by the remote control on the suction foot.

8. The method of claim 7, wherein the remote controlled actuator is remotely controlled by a hardwired connection between the remote control and the remote controlled actuator, wherein the method comprises:
 providing the hardwired connection within the flexible tube lift by operating the vacuum pump to suck the hardwired connection into the flexible tube.

* * * * *